(12) United States Patent
Heigl et al.

(10) Patent No.: US 6,634,671 B2
(45) Date of Patent: Oct. 21, 2003

(54) VEHICLE OCCUPANT PROTECTION SYSTEM

(75) Inventors: Jürgen Heigl, Böbingen (DE); Steffen Rothweiler, Alfdorf (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 10/001,166

(22) Filed: Oct. 23, 2001

(65) Prior Publication Data

US 2002/0084633 A1 Jul. 4, 2002

(30) Foreign Application Priority Data

Oct. 23, 2000 (DE) ..................... 200 18 091 U

(51) Int. Cl.[7] .................. B60R 21/16; B60R 21/22
(52) U.S. Cl. .................. 280/743.2; 280/730.2
(58) Field of Search .............. 280/749, 743.2, 280/730.2; 188/267.1, 267.2

(56) References Cited

U.S. PATENT DOCUMENTS

| | | | | |
|---|---|---|---|---|
| 5,249,825 A | * | 10/1993 | Gordon et al. | 280/728.1 |
| 5,308,113 A | * | 5/1994 | Moriset | 280/743.2 |
| 5,362,101 A | * | 11/1994 | Sugiura et al. | 280/743.2 |
| 5,887,894 A | * | 3/1999 | Castagner et al. | 280/743.2 |
| 6,073,959 A | * | 6/2000 | Heinz et al. | 280/729 |
| 6,076,854 A | * | 6/2000 | Schenck et al. | 280/743.2 |
| 6,168,193 B1 | * | 1/2001 | Shirk et al. | 280/730.2 |
| 6,168,194 B1 | * | 1/2001 | Cuevas et al. | 280/730.2 |
| 6,173,989 B1 | * | 1/2001 | Stutz | 280/730.2 |
| 6,176,515 B1 | * | 1/2001 | Wallner et al. | 280/730.2 |
| 6,203,058 B1 | * | 3/2001 | Elqadah et al. | 280/730.2 |
| 6,237,939 B1 | * | 5/2001 | Resh | 280/730.2 |
| 6,276,712 B1 | * | 8/2001 | Welch et al. | 280/730.2 |
| 6,308,982 B1 | * | 10/2001 | Wallner et al. | 280/730.2 |
| 6,315,323 B1 | * | 11/2001 | Pack, Jr. | 280/743.2 |
| 6,390,501 B1 | * | 5/2002 | Greib et al. | 280/743.2 |
| 6,394,239 B1 | * | 5/2002 | Carlson | 188/267.2 |
| 6,431,588 B1 | * | 8/2002 | Bayley et al. | 280/730.2 |

FOREIGN PATENT DOCUMENTS

| | | | |
|---|---|---|---|
| JP | 0 6286543 A | * | 10/1994 |
| JP | 11245758 A | * | 9/1999 |
| JP | 2000071911 A | * | 3/2000 |
| WO | WO 99/48728 A1 | * | 9/1999 |

* cited by examiner

Primary Examiner—Paul N. Dickson
Assistant Examiner—Ruth Ilan
(74) Attorney, Agent, or Firm—Tarolli, Sundheim, Covell & Tummino L.L.P.

(57) ABSTRACT

A vehicle occupant protection system comprises an inflatable gas bag, a tensioning band which is tensioned in the case of inflation of the gas bag so that the tensioning band has a tension, and a device which at the end of a predetermined period of time after inflation of the gas bag reduces the tension of the tensioning band.

12 Claims, 6 Drawing Sheets

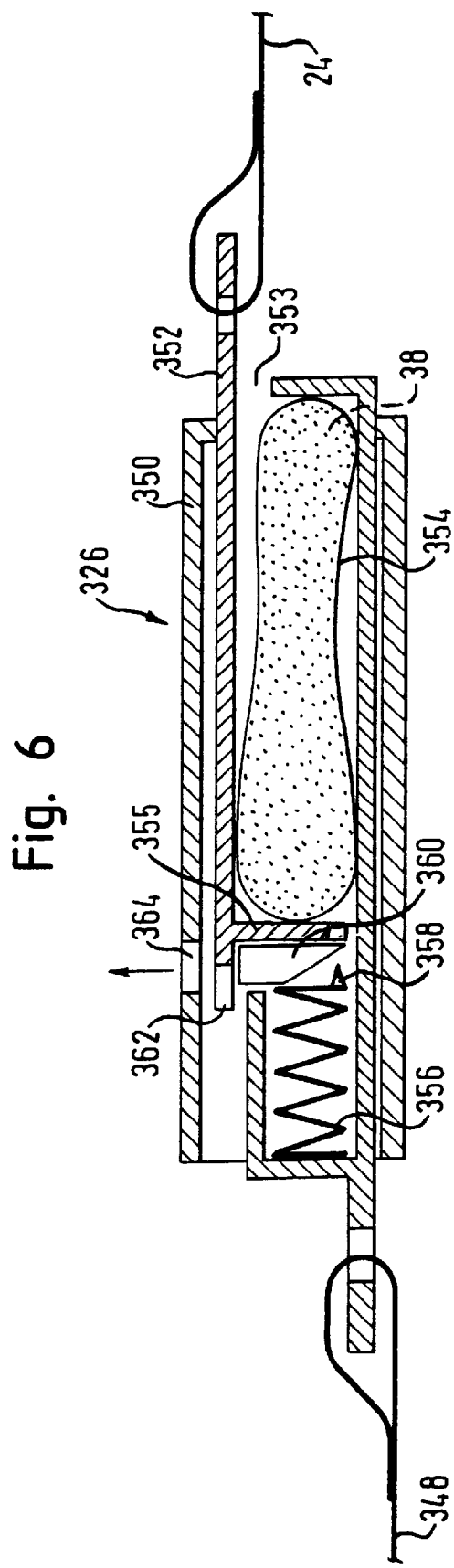

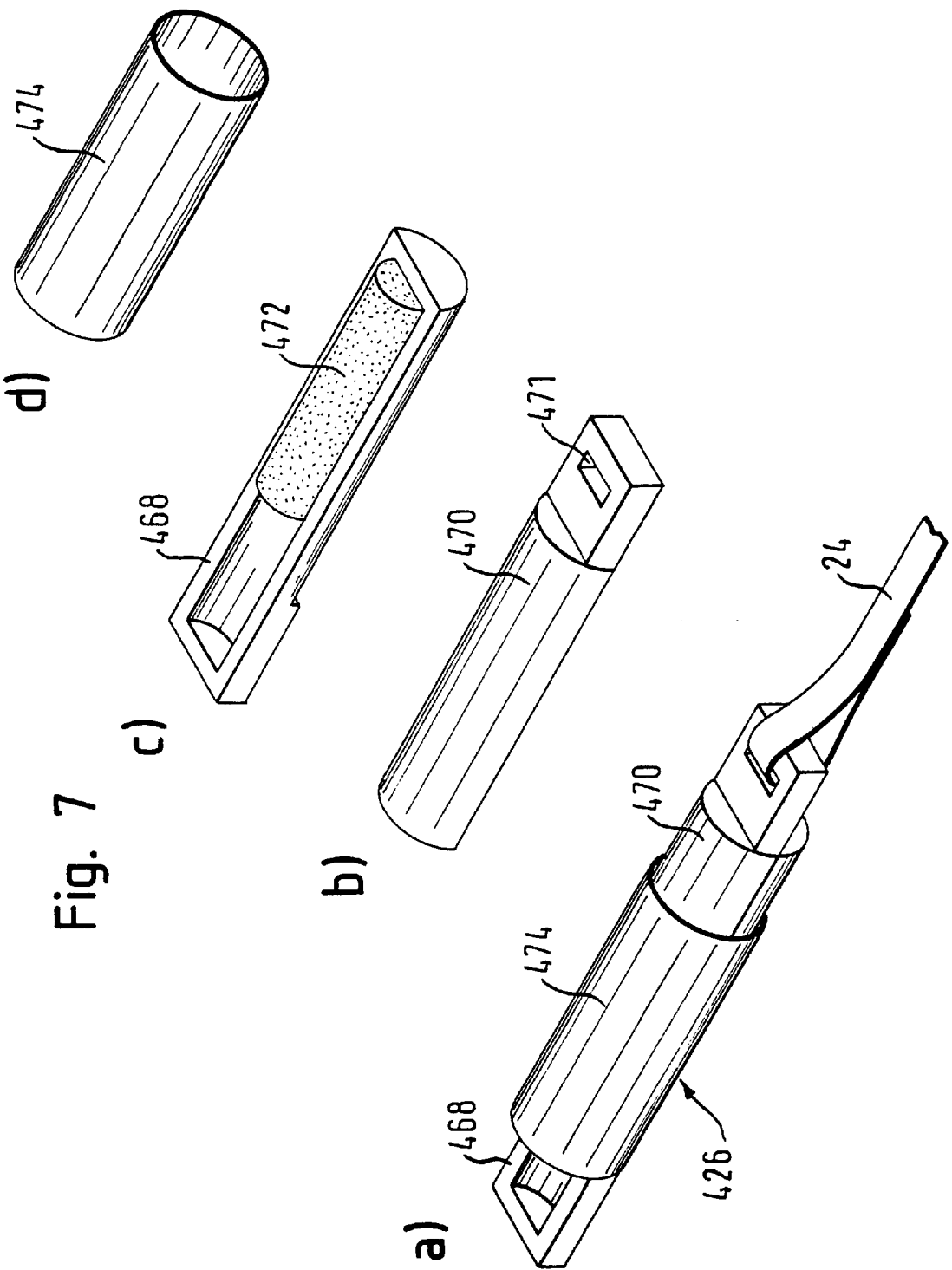

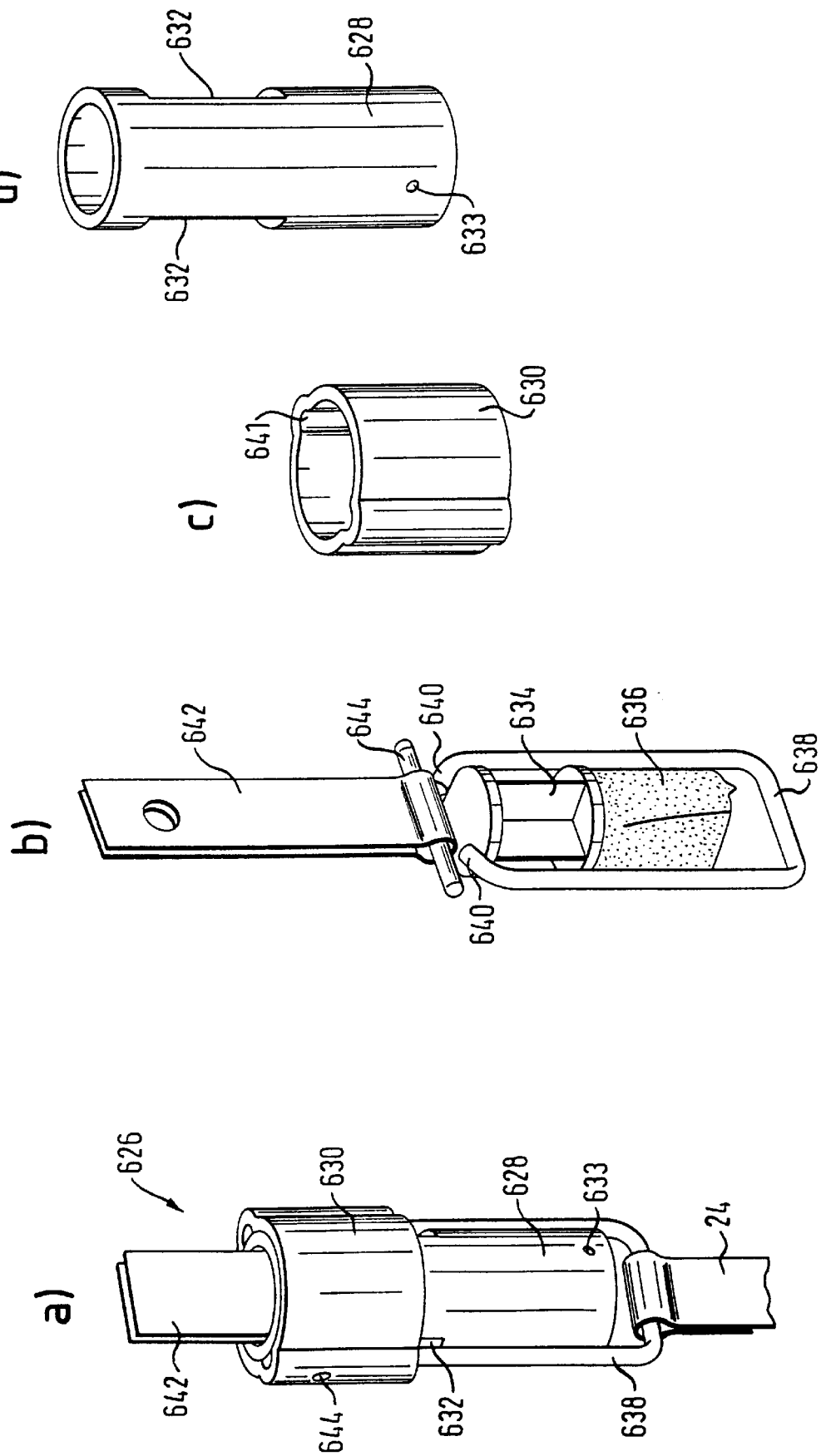

US 6,634,671 B2

VEHICLE OCCUPANT PROTECTION SYSTEM

TECHNICAL FIELD

The invention relates to a vehicle occupant protection system comprising an inflatable gas bag, in particular a side gas bag curtain.

BACKGROUND OF THE INVENTION

In curtain-like side gas bags which cover almost the complete side window of a vehicle there is often used an anchoring by means of tensioning bands to fix the gas bag, so that vehicle occupants can not be hurled out of the vehicle when the side panes break in an accident. Such an anchoring fixes the gas bag even when the gas has already escaped therefrom for the most part.

It is the object of the invention to make available a vehicle occupant protection system, including a gas bag, which allows a very fast escape or rescue of the occupant.

BRIEF SUMMARY OF THE INVENTION

The invention provides a vehicle occupant protection system comprising an inflatable gas bag, a tensioning band which is tensioned in the case of inflation of the gas bag so that the tensioning band has a tension—also named anchoring force in the following—and a device which at the end of a predetermined period of time after inflation of the gas bag reduces the tension of the tensioning band.

When the anchoring force is reduced by the separate device arranged outside the gas bag, the gas bag can be pushed aside in order to allow the vehicle occupant to immediately get out of the vehicle, or to simplify for the rescuers the saving or first medical care of a vehicle occupant. Reduction of the anchoring force preferably takes place only after such a period of time after which the gas bag does not have to furnish a restraining effect any more.

This period of time preferably lies between 7 and 30 seconds. After this time direct follow-on accidents are not to be expected any more, the gas bag already has almost completely lost its restraining effect due to the outflow of the gas, rescuers have not yet reached the vehicle and a vehicle occupant normally tries after this time to leave the vehicle if capable to do that.

Preferably, the tensioning band is directly connected with the device. In this way the anchoring force acting on the tensioning band can be reduced in a simple manner.

The device may comprise a coupling which detaches the tensioning band from the device at the end of the predetermined period of time (which time can also be determined by a predefined tensioning path). This has the advantage that saving and self-rescue are simplified, as the gas bag can be folded aside when the tensioning band is released at one side of the gas bag.

In a preferred embodiment of the invention the device comprises a medium having a high viscosity. It is also favorable when the device comprises a medium having a variable viscosity; the medium may be an electrorheological or magnetorheological fluid.

The device preferably comprises a component which is arranged in the medium and is moved therein after the tensioning cable or band having been tensioned. It is favorable when the component is connected with the tensioning band and so the anchoring force acting on the tensioning band is transferred to the component, which force causes the component to be moved through the medium. In this manner there can be realized a simple "time switch" arrangement in which the period of time can be predetermined for instance by the viscosity of the fluid, the working surface which presents the component to the fluid on moving, or the travel path through the fluid which is to be covered by the component.

In case the medium is an electrorheological or magnetorheological fluid, the viscosity of the fluid can also be influenced from outside, e.g. by a time switch or a sensor.

In a preferred embodiment of the invention the medium having high viscosity is contained in a sack. The sack preferably forms part of the device. After tightening of the tensioning band the sack may be opened to allow the medium to flow out. Through the change in the shape which can be achieved thereby, the coupling mentioned above can be actuated, for instance. Due to the high viscosity the outflow of the medium needs a specific period of time, which can be set via the viscosity of the medium.

In order to achieve an anchoring force which is sufficiently high, the tensioning band can be connected at one end with a tightening device. The tensioning band can at least in part also be tensioned by the inflation of the gas bag.

In a further advantageous embodiment of the invention the device comprises a locking mechanism which is locked by the tensioning of the tensioning band and is unlocked by a lessening of the internal pressure of the gas bag. Since the restraining effect of a gas bag drastically lessens upon lessening of its internal pressure, there is no danger at this point in time that the restraining effect of the gas bag would still be necessary. The device may work without further sensors or signal transmitters, which keeps costs low.

BRIEF DESCRIPTION OF THE DRAWINGS

FIG. 6 shows a device according to a fourth embodiment of the invention;

FIGS. 7a through d show a device according to a fifth embodiment of the invention;

FIGS. 9a through 9d show a device according to a seventh embodiment of the invention.

DETAILED DESCRIPTION OF PREFERRED EMBODIMENTS

Figure 1:
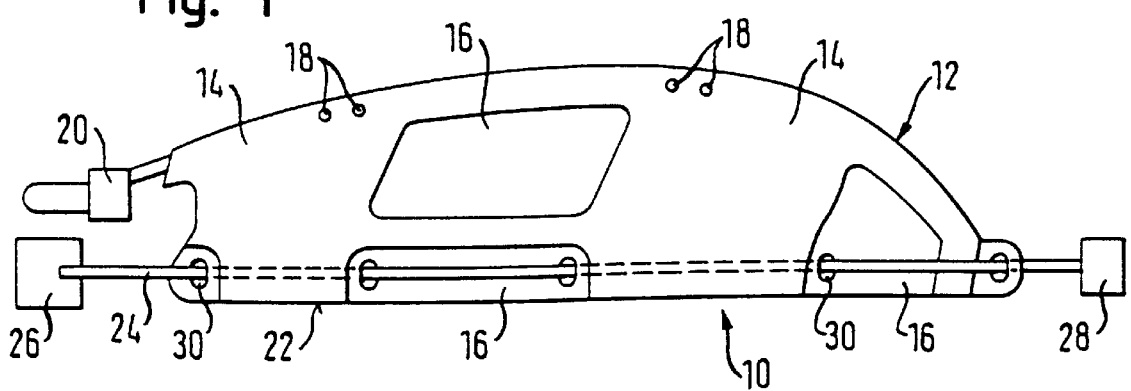
FIG. 1 is a vehicle occupant protection system according to the invention, in a schematic drawing, the devices according to the following drawings being able to be used with the system of FIG. 1.

FIG. 1 shows a vehicle occupant protection device 10 according to the invention and having a side gas bag curtain, in the following named gas bag 12, which comprises several inflatable restraint chambers 14 as well as non-inflatable portions 16. Via securing elements 18 the gas bag can be secured in the region of the roof of a vehicle. In the case of restraint, the gas bag 12 is filled by an inflator 20. A tensioning band 24 extends along the lower edge 22 of the gas bag 12. The tensioning band 24 is connected at one end with a separate device 26 arranged outside the gas bag 12 which brings about a reduction of the anchoring force acting on the tensioning band. At the other end the tensioning band may be connected to a tightening device 28 which in the case of restraint tightens the tensioning band and creates an anchoring force in the tensioning band. The anchoring force may also be created or enhanced by the guidance of the tensioning band. For this, the tensioning band extends along the lower edge 22 of the gas bag 12 in sections and alternately at the outer sides of the restraint chambers 14 and is guided in eyes 30 in such a manner that it is movable with respect to the gas bag. Due to the expansion of the restraint chambers 14 upon filling of the gas bag, the distance which has to be covered by the tensioning band is increased and a tightening of the tensioning band 24 is brought about.

The invention may also be used with any other tensioning band designs.

Figure 2A:
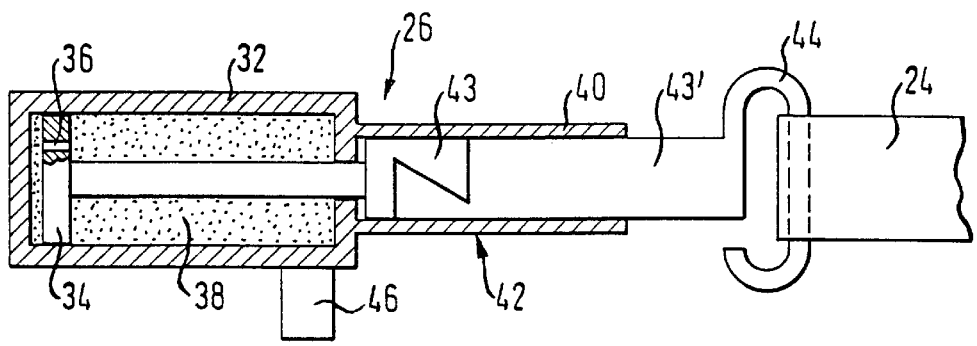
FIGS. 2a and 2b show a first embodiment of a device for reducing the anchoring force of a vehicle occupant protection system according to the invention.
Figure 2B:
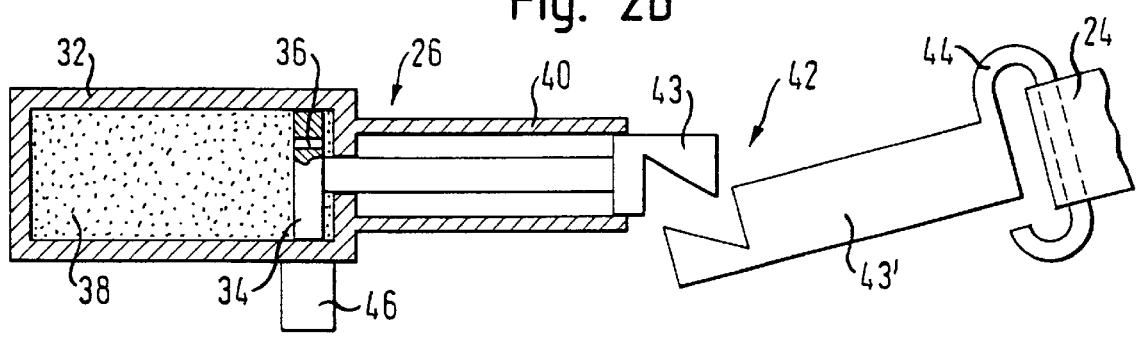

FIG. 2a shows a first embodiment of the device 26 for reducing the anchoring force in the tensioning band 24. The device 26 comprises a piston 34 which is guided in a housing 32 and has a small opening 36. The housing 32 is filled with a medium 38 having a high or a variable viscosity, for instance a electrorheological or magnetorheological fluid.

The device further comprises a coupling 42 guided in a housing section 40, the coupling on the one hand being connected to the piston 34 and on the other to the tensioning band 24, possibly via a hook-like connecting element 44. As is shown here, the coupling is formed by two intermeshing parts 43, 43' of a metal rod, which are held together by the housing section 40.

Prior to inflation of the gas bag the piston 34 is situated at the end of the housing 32 facing away from the end of the tensioning band, left-hand in FIG. 2a. When an anchoring force is exerted on the tensioning band 24 in the case of restraint, the force is transferred via the coupling 42 to the piston 34. After that, the piston 34 is moved through the medium having high viscosity, the medium 38 being able to flow through the opening 36. Due to the high viscosity of the medium 38 the piston needs some time until it has reached the other end of the housing 32. The length of the housing section 40 is selected such that the coupling 42 opens not before the piston 34 has moved through the medium 38 by the desired period of time. This period of time can be adjusted via the length of the housing as well as the viscosity of the medium 38, it preferably amounting to between 7 and 30 seconds.

As medium 38 there can also be employed an electrorheological or magnetorheological fluid, the viscosity of which can be adjusted by an electric or magnetic field applied from outside. Adjusting the viscosity may be performed by preselected parameter or as a function of the crash sequence. With using such a fluid, a device 46 is provided for adjusting the viscosity, via which device the desired electric or magnetic field can be generated in the fluid.

After disengaging of the coupling 42, the end of the tensioning band 24 is free and the gas bag can easily be pushed aside.

Figure 3A:
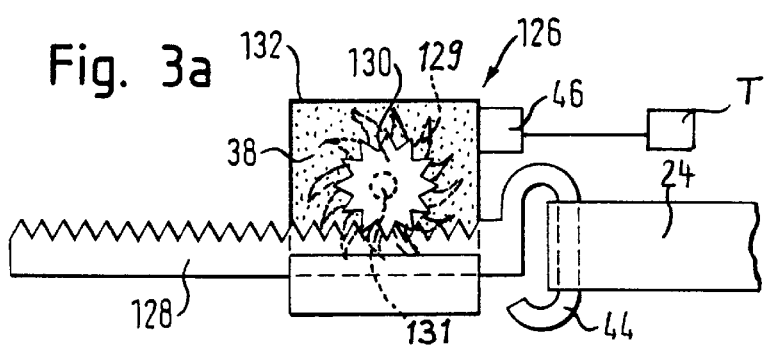
FIGS. 3a and 3b show a device according to a second embodiment of the invention.
Figure 3B:
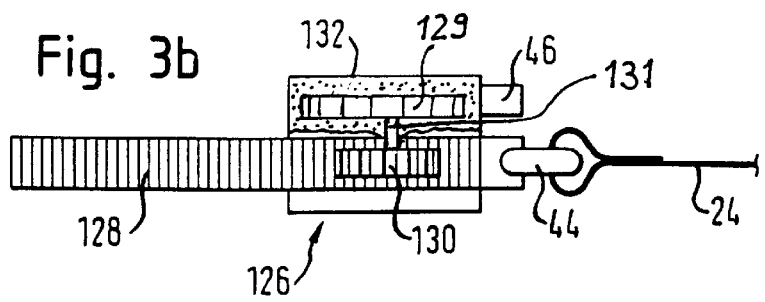

FIGS. 3a and 3b show section-wise a device for reducing the anchoring force in the tensioning band, according to a further embodiment of the invention. Components already known keep their reference numerals. The device 126 likewise comprises a housing 132 which is filled with a medium 38 having high viscosity. The medium 38 again can be an electrorheological or magnetorheological fluid. In the latter cases, likewise a device 46 for generating an electric or magnetic field is provided.

A gear-like or paddle-wheel-like brake disk 129 is arranged in the medium 38 and is connected with a gear 130 via a shaft 131. The gear 130 meshes with a rack 128 connected to the end of the tensioning band 24, possibly via a connecting element 44. FIG. 3b shows the device 126 in a top view.

Upon occurring of an anchoring force in the tensioning band, this force is transferred to the rack 128 and from there to the gear 130. The brake disk 129 and, thus, the gear 130 are braked down by the highly viscous medium 38, so that the rack 128 can move only slowly. At the end of the predetermined period of time the rack 128 has traveled its way below the gear 130 and leaves the device 126, so that the tensioning band 24 is released. According to a further embodiment, a time switch T can be coupled with the device 46. Before the predetermined period of time has lapsed, the viscosity of the medium is kept extremely high by the device 46. When the period of time has lapsed which is determined by the time switch T, the device significantly reduces the viscosity of the medium so that a movement of the brake disk 129 is allowed at the first time.

Figure 4:
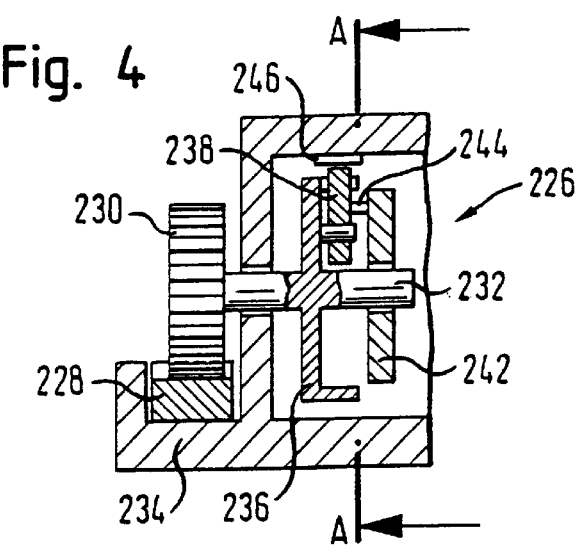
FIG. 4 shows a device according to a third embodiment of the invention, in section.
Figure 5A:
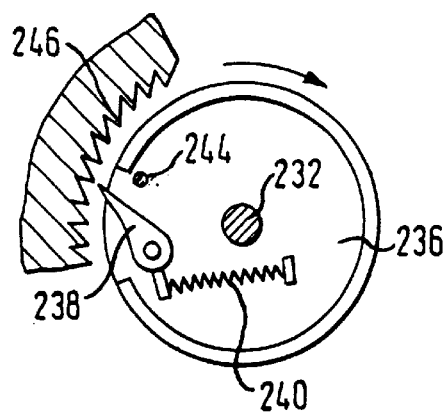
FIGS. 5a and 5b show a section taken through the device of FIG. 4 along line A—A in two different operating conditions.
Figure 5B:
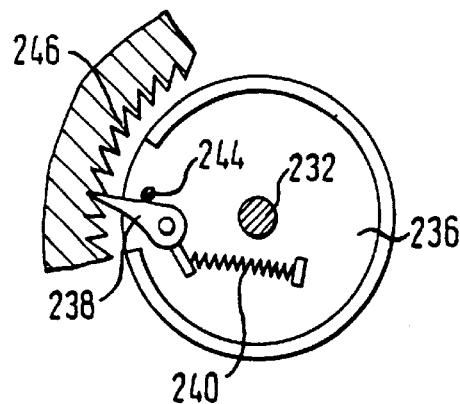

A device according to a third embodiment of the invention is shown in FIGS. 4, 5a and 5b.

The device 226 likewise comprises
a rack 228 and a gear 230. The rack 228 is connected to the end of the tensioning band 24. The gear 230 is firmly connected to a locking disk 236 via a shaft 232 which is supported in a housing 234, the housing also constituting a guidance for the rack 228. A locking pawl 238 is rotatably arranged on the locking disk. The locking pawl 238 is connected with a return spring 240.
On the shaft 232 there is mounted an inertial disk 242 as well. A stud 244 on the inertial disk 242 is arranged such that it can come into contact with the locking pawl 238. On a section surrounding the locking disk 236, the housing 234 has a locking toothing 246 into which the locking pawl 238 can engage.

The device 226 works similar to a blocking mechanism of a belt retractor. When in the case of restraint through the tightening of the tensioning band a high acceleration acts on the pinion 230 via the rack 228, the gear 230 and with it the locking disk 236 begins to rotate (direction of arrow in FIG. 5a). The inertial disk 242, however, initially remains in its position so that it is rotated relative to the locking disk 236.

By the stud 244 on the inertial disk 242, the locking pawl 238 is moved outwards and comes into engagement with the locking toothing 246. As a result of this, a further movement of the gear 230, the rack 228 and, hence, the tensioning band 24 is prevented. Now the anchoring force acts on the tensioning band 24. The device 226 works particularly advantageously when the anchoring of the gas bag is at least in part brought about by inflation of the gas bag itself.

As soon as the pressure in the gas bag 12 lessens, the anchoring force acting on the tensioning band 24 decreases, and with that the pull which is transferred to the locking disk 236 via the rack 228 and the gear 230. The return spring 240 swivels back the locking pawl 238 and in so doing detaches it from the locking toothing 246, and the gear 230 is free for rotation. The rack 228 is pulled out under the gear 230 and with that the end of the tensioning band 24 is separated from the device 226.

A further embodiment of a device according to the invention is illustrated in FIG. 6. The device 326 is on the one hand connected to a vehicle-fixed part (not shown) via a band 348, for instance, and on the other to a tensioning band 24.

The device comprises a housing 350 in which a movable flat slide 352 is arranged such that it projects from the housing through an opening 353 at the side of the housing 350 oriented toward the tensioning band 24. The projecting end of the slide 352 is connected to the tensioning band 24.

A sack 354 is arranged in the housing 350 so as to be prevented from being shifted, the sack 354 being filled with a fluid 38 having a high viscosity. Close to its end facing away from the opening 353 the slide 352 has a support surface 355 which is in contact with the sack 354. On the side of the device 326 facing away from the tensioning band 24 is arranged a spring 356 so as to be in line with the sack 354. The spring 356 has a spike 358 at its end facing the sack 354. Before unfolding of the gas bag 12, the spring 356 is held in the tensioned condition by a wedge 360. The slide 352 and the housing 350 have openings 362, 364 which allow a passing of the wedge 360. The opening 362 in the slide is so far displaced with respect to the wedge 362 that the latter is held in its position as long as the gas bag 12 is not inflated and the tensioning band 24 is not tightened.

When the tensioning band 24 is tightened in the case of restraint, initially the slide 352 is moved a short distance towards the opening 353 until it is stopped by the support surface 355 of the tight, uncompressible sack 354. Through this movement of the slide 352 the opening 362 in the slide 352 is in alignment with the wedge 360. Due to the force which is exerted by the spring 356 on the wedge surface of the wedge 360, the latter is pushed out of the housing 350 through the openings 362, 364. Now the spring 356 is not any longer retained by the wedge 360 and relaxes until the spike 358 meets the sack 354. The elastic force of the spring 356 and the viscousness of the material of the sack 354 are coordinated with each other such that the spike 358 generates a small hole in the sack 354, through which the fluid 38 can escape.

Due to the force transferred via the tensioning band 24 to the support surface 355, the fluid 38 is pressed out of the sack 354 and the slide 352 moves through the opening 353. This movement is assisted by the spring tension, because the spring 356 likewise presses on the sack 354. When the support surface 355 reaches the end of the housing 350 at the side of the tensioning band, the slide 352 leaves the housing 350 through the opening 353 and the tensioning band 24 is detached from the device 326.

The period of time until the tensioning band will be released can be adjusted by the viscosity of the fluid, it having an approximately constant viscosity over the entire temperature range from −40° C. to +80° C.

FIGS. 7a through d show a further embodiment of a device according to the invention. The device 426 is on the one hand secured to a vehicle-fixed part (not shown) and on the other to a tensioning band 24.

The device 426 comprises a first piston 468 and a second piston 470 which are both designed in the shape of a trough. Both pistons 468, 470 have the same diameter in transverse direction. The piston 468 is connected to a vehicle-fixed part, whilst piston 470 is connected to the tensioning band 24 via an eye 471, for instance.

Moreover, there are provided an elongated sack 472 filled with a fluid of high viscosity as well as a sleeve 474. The sack 472 may consist of a foil or any other suitable material.

The two pistons 468, 470 are in contact with each other at their concave faces. The sack 472 is arranged in the hollow space formed between the two pistons 468, 470. The sleeve 474 has been slipped over the two pistons 468, 470 and hinders the pistons from moving away from each other in the radial direction. A relative movement of the pistons in the axial direction is prevented by the tight sack 472 filled with fluid.

When the tensioning band 24 is tightened upon inflation of the gas bag 12, the two pistons 468, 470 are stressed axially against each other. Through this stress the sack 472 ruptures and the fluid can escape. Now the two pistons 468, 470 move relative to each other in axial direction. When the second piston 470 leaves the sleeve 474, the tensioning band 24 is detached from the device.

The period of time until the tensioning band is released may be adjusted by the viscosity of the fluid.

Figure 8:
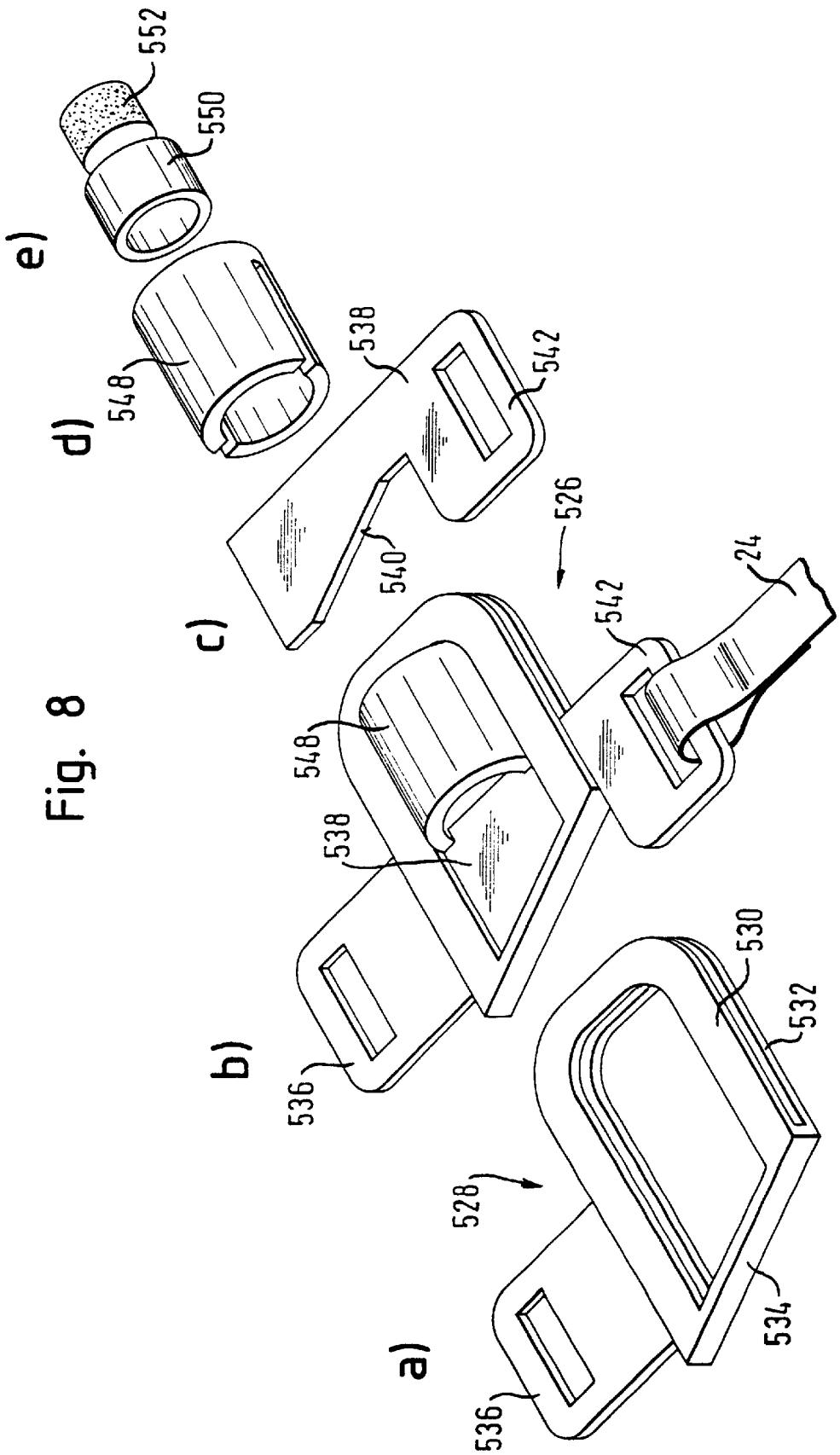
FIGS. 8a through e show a device according to a sixth embodiment of the invention.

In FIG. 8b is shown a further device 526 according to the invention, its individual parts being illustrated in the FIGS. 8a, c, d and e. This device is also connected at one side to a vehicle-fixed part (not shown) and at the other side to a tensioning band 24.

The device 526 comprises a receiving means 528 having two superimposed material strips 530, 532 in the shape of a horse-shoe which are connected at the open side of the horse-shoe by a web 534. The two arms of the horse-shoe 534 are not equally long, so that the web runs obliquely to the arms of the horse-shoe. An attachment eye 536 is formed on the one arm of the horse-shoe, via which eye the receiving means 528 can be secured to a vehicle-fixed part.

Between the material strips 530, 532 is arranged a flat, strip-shaped material section 538 (FIG. 8c) in such manner that it runs at right angles to the arms of the horse-shoe. The material section 538 has an inclined portion 540 which abuts at the web 534. The material section 538 has an eye 542 to which the tensioning band 24 is secured. This eye 542 lies outside the receiving means 528.

A cylinder 548 having an open and a closed end is arranged between the material section 538 and the closed side of the hors-shoe of the support section 528. A piston 550 and a sack 552 (FIG. 8e) filled with a fluid having a high viscosity are accommodated in the cylinder 548. At its open end facing the material section 538, the cylinder 548 has a slot for receiving the material section 538. The sack 552 abuts at the other, closed end of the cylinder 548. The piston 550 is in contact with the material section 538.

When the tensioning band 24 is tightened upon inflation of the gas bag 12, the tension force acting at right angles to the legs of the horse-shoe is converted by the inclined portion 540 into a laterally acting force which acts on the piston 550 and via the latter on the sack 552. This force causes rupturing of the sack 552, whereupon the fluid contained in the sack leaks out relatively slow due to the high viscosity. The more fluid has leaked out of the sack 552, the farther the material section 538 can be pulled out of the receiving means 528. When the sack 552 is empty, the material section can be pulled out of the receiving means completely, so that the tensioning band 24 is detached from the device 526.

The period of time until the tensioning band is released can be adjusted by the viscosity of the fluid.

Still a further embodiment 626 according to the invention is shown in FIG. 9a. The FIGS. 9b through d show its individual parts. The device 626 also is connected at the one hand to a vehicle-fixed part (not shown) and at the other to a tensioning band 24.

The device 626 comprises a cylinder 628 and a sleeve 630. The sleeve 630 is put on the cylinder 628 and is shorter than the latter in longitudinal direction.

The cylinder 628 is closed at one end and open at the other and has two opposite oblong holes 632 which, starting close to the open end, run along the longitudinal side of the cylinder. There is additionally provided a small outlet orifice 633 near the closed end.

Provided in the cylinder 628 is a piston 634 which is arranged above a sack 636 filled with a fluid of high viscosity. The sack 636 abuts at the closed end of the cylinder.

An approximately U-shaped stirrup 638 is also provided. The ends 640 of the "U" are obliquely bent inwards. The stirrup 638 is arranged around the cylinder 628 in such a manner that its closed side faces the closed end of the cylinder 628 whilst the oblique ends 640 project through the oblong holes 632 into the interior of the cylinder and are in contact with the piston at its side facing away from the closed end of the cylinder. The tensioning band 24 is secured to the closed end of the stirrup 638. The stirrup is received in a guide 641 of the sleeve 630 on a section in the vicinity of the oblique ends 640, which guide prevents a rotation or tilting of the stirrup with respect to the cylinder.

The device 626 is secured to a vehicle-fixed part for instance by a further tensioning band 642 which is connected to the cylinder 628 and the sleeve 630 by a pin 644. The pin 644 may at the same time serve for fixing the cylinder 628 and the sleeve 630 to each other.

When upon inflation of the gas bag 12 the tensioning band 24 is tightened, force is transferred to the piston 634 via the stirrup 638 and the sack 636 is compressed between the piston 634 and the closed end of the cylinder 628. This leads to a bursting of the sack 636. The fluid escapes through the outlet orifice 633 to the open so that the piston moves toward the closed end of the cylinder. The stirrup 638 moves with the piston 634 in the direction of the tensioning band 24. After a predetermined travel the stirrup 638 leaves the guidance of the sleeve 630. The oblong holes 632 are designed such that the oblique ends 640 of the stirrup 638 may leave them, when the stirrup is not guided by the sleeve 630 any longer. In this way the tensioning band 24 is decoupled from the device 626.

The period of time which passes until the detaching of the tensioning band 24 can be adjusted by the viscosity of the fluid and the diameter of the outlet orifice 633.

The invention is not limited to the embodiments described. In particular also individual features of the various embodiments may be combined according to the convenience of the person skilled in the art.

What is claimed is:

1. A vehicle occupant protection system comprising:
   an inflatable side gas bag curtain,
   a tensioning band which is tensioned in the case of inflation of said gas bag so that said tensioning band has a tension, and
   a device which at the end of a predetermined period of time after inflation of said gas bag reduces said tension of said tensioning band.

2. The vehicle occupant protection system according to claim 1, wherein said tensioning band is directly connected with said device.

3. The vehicle occupant protection system according to claim 1, wherein said device comprises a coupling which detaches said tensioning band from said device at the end of said predetermined period of time.

4. The vehicle occupant protection system according to claim 1, wherein said device comprises a medium having a high viscosity.

5. The vehicle occupant protection system according to claim 4, wherein said device has parts, and wherein said medium having a high viscosity is contained in a sack which tears as of a predetermined tension, subsequently said medium flowing out being displaced by said parts in said device which are moved with respect to each other.

6. The vehicle Occupant protection system according to claim 1, wherein said device comprises a locking mechanism which is locked by tensioning of said tensioning band and is unlocked by a lessening of an internal pressure of said gas bag.

7. A vehicle occupant protection system comprising:
   an inflatable gas bag,
   a tensioning band which is tensioned in the case of inflation of said gas bag so that said tensioning band has a tension, and
   a device which at the end of a predetermined period of time after inflation of said gas bag reduces said tension of said tensioning band, said device comprising a medium having a variable viscosity.

8. The vehicle occupant protection system according to claim 7, wherein said medium is an electrorheological or magnetorheological fluid.

9. The vehicle occupant protection system according to claim 7, wherein said device comprises a component which is arranged in said medium.

10. The vehicle occupant protection system according to claim 9, wherein said component is moved in said medium after said tensioning band is tensioned.

11. A vehicle occupant protection system comprising:
    an inflatable gas bag,
    a tensioning band which is tensioned in the case of inflation of said gas bag so that said tensioning band has a tension, and
    a device which at the end of a predetermined period of time after inflation of said gas bag reduces said tension of said tensioning band,
    said tensioning band being-connected at one end with a tightening device.

12. The vehicle occupant protection system according to claim 11, wherein said device is arranged at an end of said tensioning band opposite to said end with said tightening device.

* * * * *